US012126488B2

(12) United States Patent
Khan et al.

(10) Patent No.: US 12,126,488 B2
(45) Date of Patent: *Oct. 22, 2024

(54) NETWORK SWITCH STACK FAILOVER CONFIGURATION MANAGEMENT

(71) Applicant: Hewlett Packard Enterprise Development LP, Spring, TX (US)

(72) Inventors: Aslam Khan, Santa Clara, CA (US); Sudhakar Mohan, Santa Clara, CA (US); Manpreet Singh, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,583

(22) Filed: Jan. 8, 2024

(65) Prior Publication Data
US 2024/0223437 A1  Jul. 4, 2024

Related U.S. Application Data

(63) Continuation of application No. 18/046,484, filed on Oct. 13, 2022, now Pat. No. 11,888,681.

(51) Int. Cl.
*H04L 41/0654* (2022.01)
*H04L 41/0663* (2022.01)
*H04L 41/082* (2022.01)
*H04L 41/0823* (2022.01)
*H04L 41/22* (2022.01)

(52) U.S. Cl.
CPC ...... *H04L 41/0654* (2013.01); *H04L 41/0663* (2013.01); *H04L 41/082* (2013.01); *H04L 41/0836* (2013.01); *H04L 41/22* (2013.01)

(58) Field of Classification Search
CPC ........... H04L 41/06–0695; H04L 41/08–0897
See application file for complete search history.

(56) References Cited

U.S. PATENT DOCUMENTS

| 7,580,415 B2 | 8/2009 | Hudson et al. |
| 7,593,320 B1 | 9/2009 | Cohen et al. |
| 7,675,869 B1 | 3/2010 | Anker et al. |

(Continued)

FOREIGN PATENT DOCUMENTS

CN     112074812 A     12/2020

*Primary Examiner* — Brendan Y Higa
(74) *Attorney, Agent, or Firm* — Slater Matsil, LLP

(57) ABSTRACT

A network infrastructure management console configures one or more network switch stacks each comprising a plurality of switches. A monitoring component monitors a current conductor switch of the stack. A user interface (UI) backend component comprises a cache memory and receives a user request to configure the stack. The UI backend component receives from the monitoring component notification of the current conductor and stores in a cache memory segment associated with the current conductor the requested configuration changes. If the current conductor switch of the stack has changed due to a failover event, the configuration changes stored in the cache memory segment associated with the previous current conductor are written to a cache memory segment associated with the new current conductor. A configuration push component receives the configuration changes and transmits the configuration changes to the network switch stack.

20 Claims, 7 Drawing Sheets

(56) References Cited

U.S. PATENT DOCUMENTS

| | | | |
|---|---|---|---|
| 7,697,419 B1* | 4/2010 | Donthi | H04L 41/22 |
| | | | 370/386 |
| 8,144,630 B1* | 3/2012 | Orr | H04L 49/00 |
| | | | 370/257 |
| 8,683,258 B2 | 3/2014 | Kaliannan et al. | |
| 9,323,628 B2 | 4/2016 | Ngo et al. | |
| 10,228,964 B2 | 3/2019 | Caradonna et al. | |
| 10,686,734 B2 | 6/2020 | Viradiya et al. | |
| 10,713,120 B2 | 7/2020 | Aron et al. | |
| 10,761,952 B2 | 9/2020 | Selvaraj et al. | |
| 10,797,987 B1 | 10/2020 | Beacham | |
| 11,374,847 B1 | 6/2022 | Beacham | |
| 2010/0011383 A1 | 1/2010 | Abdul Kader Jailani | |
| 2013/0067049 A1* | 3/2013 | Ghosh | H04L 41/082 |
| | | | 709/221 |
| 2014/0059530 A1 | 2/2014 | Banavalikar et al. | |
| 2014/0098820 A1 | 4/2014 | Anantharam et al. | |
| 2014/0181275 A1* | 6/2014 | Lin | H04L 41/0803 |
| | | | 709/220 |
| 2014/0362852 A1 | 12/2014 | Janardhanan et al. | |
| 2015/0085704 A1* | 3/2015 | Kamble | H04L 45/586 |
| | | | 370/255 |
| 2015/0195102 A1 | 7/2015 | Mochida et al. | |
| 2019/0020626 A1 | 1/2019 | Sethi et al. | |
| 2019/0342426 A1 | 11/2019 | Momchilov | |
| 2020/0110675 A1 | 4/2020 | Wang et al. | |
| 2020/0125662 A1 | 4/2020 | Zhu et al. | |
| 2020/0313958 A1 | 10/2020 | Kashyap | |
| 2020/0322242 A1 | 10/2020 | Malysh et al. | |
| 2021/0026670 A1 | 1/2021 | Krivenok et al. | |
| 2021/0144056 A1 | 5/2021 | Chakrapani Rangarajan et al. | |
| 2021/0410038 A1 | 12/2021 | Francis et al. | |
| 2023/0092836 A1 | 3/2023 | Koundinya et al. | |
| 2023/0246948 A1* | 8/2023 | Nedungadi | H04L 41/12 |
| | | | 370/217 |
| 2023/0353506 A1 | 11/2023 | Khan et al. | |

\* cited by examiner

NETWORK SWITCH STACK FAILOVER CONFIGURATION MANAGEMENT

CROSS-REFERENCE TO RELATED APPLICATIONS

This application is a continuation application of and claims priority to U.S. patent application Ser. No. 18/046,484, now U.S. Pat. No. 11,888,681, filed on Oct. 13, 2022, the contents of which are hereby incorporated by reference in its entirety.

BACKGROUND

Cloud native management consoles provide a simple way for users to manage, monitor, and troubleshoot network infrastructure, including customer networks and networked devices, from web-based user interfaces accessible via the cloud. Such cloud-managed networking solutions can provide a single point of control to oversee aspects of wired and wireless LANs, WANs and VPNs across campus, branch, remote and data center locations. An individual network switch device includes networking hardware, such as a multiport network bridge, that connects devices on a computer network by using packet switching to receive and forward data to a destination device. Some network switches may be connected together to form a network switch stack that may operate together, functioning as a large network switch. Such switch stacks also may be configured using a cloud native management console, such as a cloud-based networking solution having a web user interface (UI). Such cloud-based network infrastructure management solutions may offer, e.g., software-as-a-service (SaaS), on-premises, and managed service options for flexible consumption and financing.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
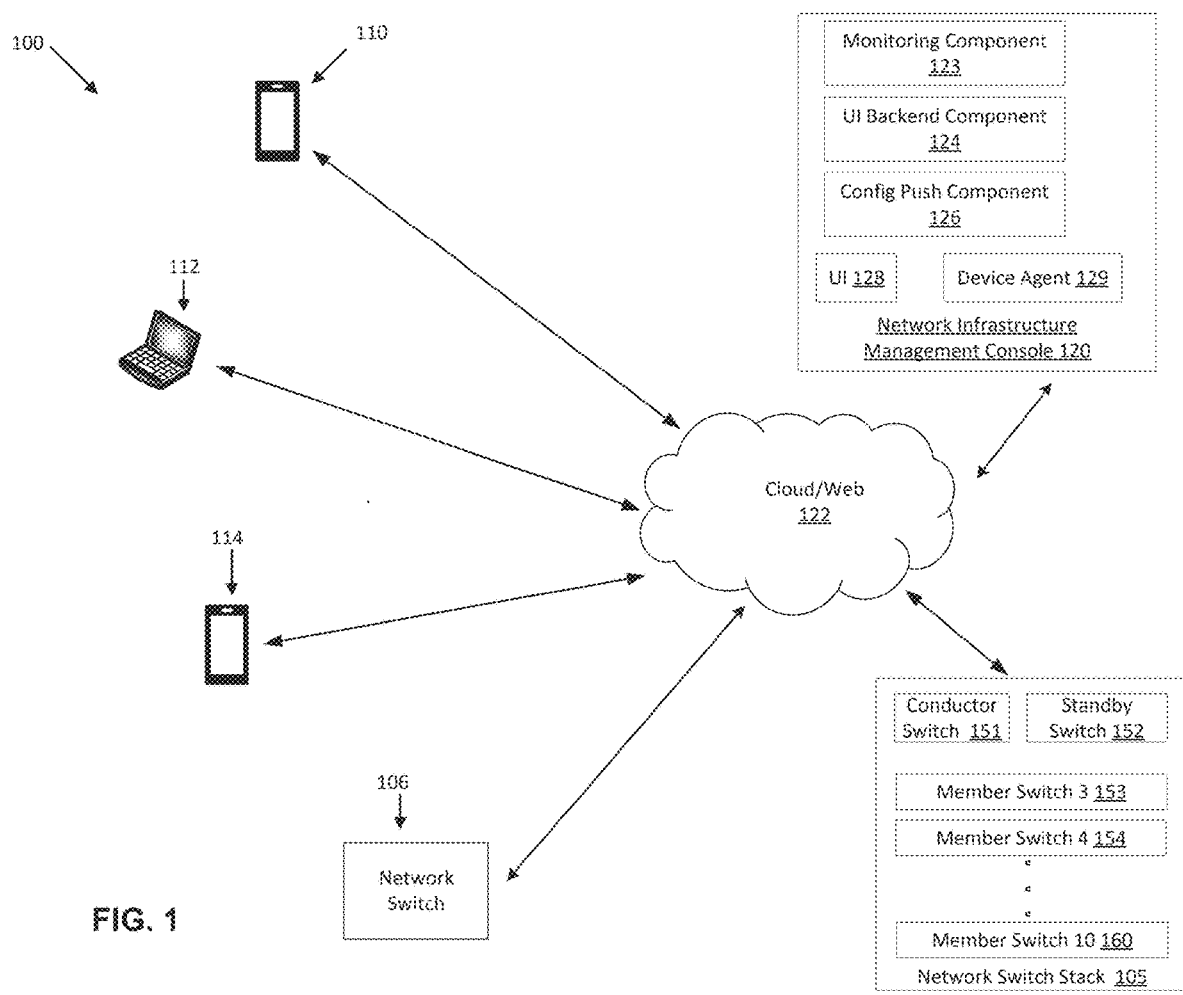
FIG. 1 illustrates an overview diagram of a cloud-managed network in accordance with an example.

While the examples are described with reference to the above drawings, the drawings are intended to be illustrative, and various other examples are consistent with the spirit, and within the scope, of this disclosure.

DETAILED DESCRIPTION

This disclosure is directed to a system, method and computer-readable medium that provide for configuration management in the event of network switch stack failover events in a network infrastructure management system. In various examples, this management architecture may be used particularly with cloud networking solutions that include management and orchestration consoles that permit day-to-day maintenance and oversight of wired and wireless local area networks (LANs), wide area networks (WANs), and virtual private networks (VPNs) across campus, branch, and remote office locations of business enterprises, including small and medium-sized businesses (SMBs).

A cloud native management console (also known as a network infrastructure management console) includes various examples described herein. A cloud native management console provides a cloud-managed networking solution that offers a simple yet powerful interface for business IT operations. A cloud native management console may serve as a management and orchestration console for a network edge service, an example of which includes an Edge Services Platform (ESP).

As known by those skilled in the art, edge computing is computing that takes place at or near the physical location of either the user or the source of the data. By placing computing services closer to these locations, users may benefit from faster, more reliable services while companies benefit from the flexibility of hybrid cloud computing. Edge computing is one way that a company can use and distribute a common pool of resources across a large number of locations. Edge is a strategy to extend a uniform environment all the way from a core data center or data centers to physical locations near users and data. Just as a hybrid cloud strategy allows organizations to run the same workloads both in their own datacenters and on public cloud infrastructure (e.g., Amazon Web Services operated by Amazon Inc., Microsoft Azure service operated by Microsoft Corp.), an edge strategy extends a cloud environment out to many more locations. Edge computing is in use today across many industries, including telecommunications, manufacturing, transportation, utilities, and many others. For example, many edge use cases are rooted in the need to process data locally in real time-situations where transmitting the data to a data center for processing can often cause unacceptable levels of latency.

A cloud native management console of the various examples herein thus provides a single point of control that may be remotely operated from any location, to oversee every aspect of wired and wireless LANs, WANs, and VPNs across campus, branch, remote, and data center locations. In addition, artificial intelligence (AI)-powered analytics, end-to-end orchestration and automation, and advanced security features may also be built natively into the solution. Additional features such as live upgrades, robust reporting, and live chat support may also be included, bringing more efficiency to day-to-day maintenance activities. Such a cloud native management console may be built on a cloud-native, microservices architecture, capable of meeting enterprise demands for scale and resiliency, and is also driven by intuitive workflows and dashboards that make it suitable for small and medium-sized businesses (SMBs) with limited IT personnel at remote locations.

A cloud native management console of examples described herein may eliminate the inefficiency of using disjointed, domain-specific network management tools. Onboarding, configuring, and provisioning network devices is a key activity in any environment, but can be time-consuming and complex. Cloud native management consoles that may utilize examples described herein may automate these processes with such features as easy setup wizards, flexible configuration options, and zero touch provisioning, and may be further aided by intuitive mobile installer apps. For example, the cloud native management console may include a network health summary dashboard that provides quick insights to analyze and improve the network-whether it be a wired or wireless LAN or LANs, or performance across a WAN. From a single dashboard, IT operators can readily assess the state of the network with views into global and site level details, across multiple selected sites, as the interface changes to show network devices and connected clients specific to that location. This way, information technology (IT) operators can swiftly identify potential problems, as well as zero-in on specific locations that demand their immediate attention. The console may also permit the IT operator or user to zero in on specific devices in the network, including a specific network switch or network switch stack.

As is known to those skilled the art, a network switch stack is a set of network switches that are interconnected through stacking ports. Network switch stacks may be set up and configured using a cloud native management console and/or a virtual switching framework (VSF). In some examples of a VSF, the first member in a stack becomes the conductor by default. The conductor switch (which may be previously known as a commander or master switch) is the switch in the stack that holds the switch configurations as entered by the user. In some examples, a standby conductor is configured or designated manually by the user and there is no default standby conductor. In some examples, any or all of the switches in the stack other than the conductor and standby conductor become members.

One problem with cloud native management consoles may occur during a failover event on a stacked network switch that occurs simultaneously or around the same time as an IT operator, working remotely, makes configuration changes to that same network switch stack. Examples disclosed herein remove the errors and/or ambiguity a user may see during the failover event, where a conductor switch of a network switch stack, which holds the switch stack configurations goes offline, and around the same time, the network administrator uses the cloud native management console to manage the configurations of the switch stack remotely. For example, the user may be managing the stack from web/cloud from some location, and the site/physical location of the stack can be in a different location, or even a different city/state. The user may not see that the conductor of the network switch stack has gone offline, and may therefore unknowingly try to adjust the configuration of the stacked switch, which cannot be pushed to the offline conductor, thus causing mismatch between the actual network state and the user's network configurations. The examples disclosed herein ensure that the user will be able to make configure the stacked switch even during a failover event, and the user's configuration changes will be transferred to the current conductor switch even if the standby switch has become the conductor switch due to a failover event.

The examples described herein help ensure that network switch stacks may be configured on the cloud native management console without interruption and in a manner that is seamless to the network administrator or other user, even during a failover event. As described above, a failover event occurs where a conductor switch of a network switch stack in the cloud environment has failed, and a corresponding standby switch of the network switch stack is therefore activated. For example, a failover event can happen due to a software or hardware issue or error with the current conductor. A failover event may also occur by user intervention (e.g., where a user executes failover console commands at site on the current conductor).

FIG. 1 illustrates an overview diagram of a cloud-managed network 100 in accordance with an example. In a cloud native management console (e.g., network infrastructure management console 120) of various examples, a user using a wireless or wired network connected device such as laptop 112 or mobile device 110 or mobile device 116 (e.g., phone or tablet) connected to cloud/web 122 can remotely access a user interface 128 via device 110, 112, or 116. The user may remotely configure any given network switch 106 by selecting it from a list of customer devices on user interface 128.

As background, network switches managed within an enterprise may have a full set of management features, including command line interface (CLI), simple network management protocol (SNMP) agent, and web interface. They may have additional features to manipulate configurations, such as the ability to display, modify, backup and restore configurations. Enterprise-managed network switches are typically found in networks with a larger number of switches and connections, where centralized management is a significant savings in administrative time and effort. A stackable network switch is a type of an enterprise-managed network switch.

In some examples, there may be different models of stackable network switches. Stackable network switches may vary based on the number of physical ports each switch supports and speed of each port, etc. In some examples, multiple switches (e.g., up to 10) can be connected together to form a single large switch known as a stack. In other examples, a stack may comprise fewer than 10 or more than 10 switches. In some examples, a User/UI using a web interface such as a cloud native management console will see the stacked switch as a single switch with a maximum of 10×48 or 10×54 ports depending on the switch models connected to form the stack. In some examples, a user may dynamically connect 2 switches to form a 2-member stack or up to 10 switches to form a 10-member stack, for example. Also, a user can also delete a member from the stack of switches to reduce the stack size. The examples herein are not limited by any particular network switch or network switch stack configuration, and may be used with any plurality of network switches that may be stacked together to form a single switch regardless of manufacturer or model, and may be used with any combination of networked switches and/or network switch stacks.

Some examples include a network infrastructure management console (or cloud native management console) 120 as shown in FIG. 1. In some examples, console 120 provides a web/cloud-based user interface (UI) 128 to configure, manage and monitor network switches and/or other networked devices. A user can use UI 128 to configure various features available on standalone network switches or networked switch stacks. In some examples, the UI 128 may have one or more forms/pages to configure one or more parameters for each feature on a particular standalone switch or a stacked switch. On a stacked switch, a user may configure and monitor the stack through the conductor.

In some examples, network switch stack 105 comprises a set of up to 10 switches (e.g., conductor switch 151, standby switch 152, and member switches 3-10 labeled in FIG. 1 as 153-160). Other example network switch stacks may have more or less than 10 switches. All the switches in network switch stack 105 are connected to each other to act as a single switch, and the stack has a designated conductor switch 151 to coordinate the stacked switch operation. Stack 105 also has a standby switch 152 which becomes the conductor, if the originally designated conductor goes down due to software or hardware or power failures or user-intervention. The rest of the member switches in the stack are treated as normal members of the network switch stack 105. The user can then configure and monitor the stack using the conductor switch 151 of the stack at the physical site/location of the stack 105, or remotely from UI 128.

In a situation where failover happens due to any software or hardware issue or user-intervention with the conductor switch 151, the web-based user interface (UI) 128 seamlessly allows managing/configuring the stack via the cloud by automatically communicating via the standby switch 152, which becomes the conductor of the networked stacked switch 105. In various examples, a backend configuration component of the UI on network infrastructure management console 120 (also known as a UI-Backend component 124) may generally allow the user to configure using the current conductor regardless of what the monitoring component 123 of console 120 sees as the actual conductor at the physical site/location.

The UI-Backend component 124 operates based on information received from the system's monitoring component 123. In this manner, the user/UI will see the same conductor as the monitoring component 123. A configuration push component 126 disclosed herein uses a current conductor connection to push any user configuration changes, even if it has lost the connection to a conductor as the configuration changes were being made, due to failover for example. UI-Backend component 124 buffers all the configuration changes done by the user. The UI-Backend component 124 then makes sure any user-entered configuration changes are pushed to the network switch stack 105 via device agent 129 which transmits the changes via a network connection to cloud/web 122. In some examples, the UI-Backend component 124 also keeps/updates a Stack ID map to the current conductor (device serial-number/name), so that it can interact with right device configuration in the cache memory to show the stack configurations to the user and also to update the conductor cache on getting device-config updates from config-push and monitoring component. In some examples, the stack ID of the stack does not change for the lifetime of the stack and during failover, but the conductor does change due to failover or user intervention.

Figure 2:
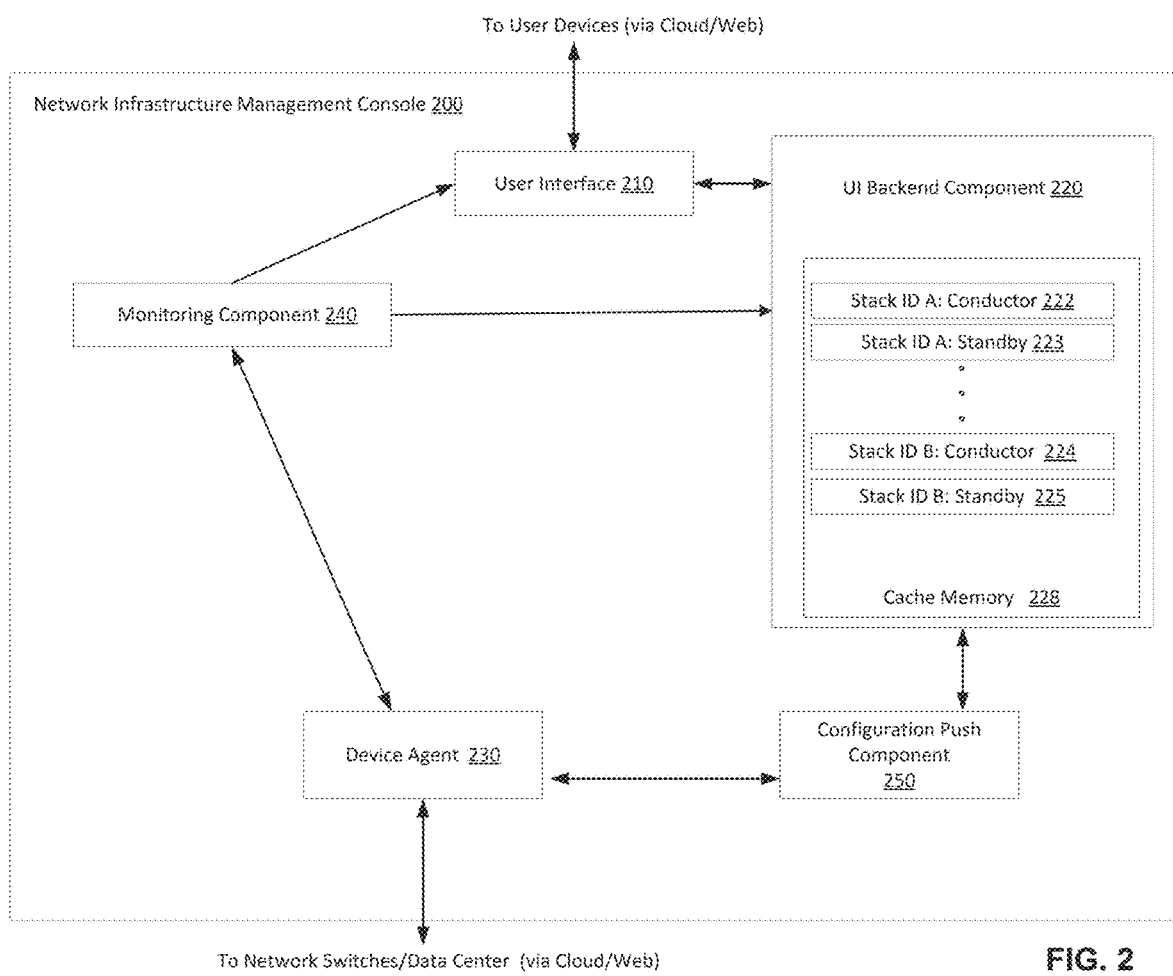
FIG. 2 illustrates an overview diagram of a network infrastructure management console in accordance with an example.

FIG. 2 illustrates an overview diagram of a network infrastructure management console 200 in accordance with an example. Network infrastructure management console 200 may comprise software instructions executing on one or more processors as discussed herein. Such software instructions are described below in terms of components. However, the components may or may not be physically separate and may include software instructions executing on one or more processors, whether physical or virtual processors, and the components may execute on the same processor or processors or different processors. Network infrastructure management console 200 includes device agent 230 having a bidirectional communication link for communicating with network switches, switch stacks, and other devices managed by the user on the network, and user interface (UI) 210 having a bidirectional communication link for transmitting a user interface to and receiving information and active requests from user devices connected to the cloud/web. Monitoring component 240, UI backend component 220, and configuration push component 220 are components in the network infrastructure management console 200 that perform operations for managing/configuring a device such as a network switch or network switch stack.

One component is monitoring component 240 which functions to monitor the status of the various connected devices via device agent 230. Without the monitoring component and the network infrastructure management console, a user may have to go to the device location/site and connect directly to the device console to do any configuration updates, status checks, etc. From the monitoring user interface (UI), a user/customer can see their network switch devices (standalone and stacked). Using the monitoring UI page, a user can monitor, configure, and troubleshoot their devices remotely from the cloud/web. From the monitoring UI, a user can also monitor which switch in the stack is the current conductor switch, standby switch, or member switch(es) and their status from a device overview page in the UI. For the stacked network switch the monitoring component 240 shows which member-switch in the stack is the conductor, which member switch is the standby conductor, and the status of each of the switch members and their links. A user may see the current conductor in the UI device list, and can select that to do any configuration change.

Another component is the Configuration UI-Backend component 220 through which a user remotely viewing user interface 210 can edit/modify the device configurations. In some examples, a user can specify a device-name in order to help the user to easily identify a device/stack among the devices the user is managing. A stacked network switch is also assigned a unique Stack ID or serial number which is assigned by the network infrastructure management console.

A user can add/delete a member to a stacked network switch from a stack management UI page. A user can also configure/manage links of stack members, etc. from the stack management UI page. By selecting a particular stack device from a device list, user can configure different features using a feature-configuration page. In some examples, configuration can be pushed or done on the conductor switch alone. In one example, a user will see all the ports of the stack, including all the members it has connected. Switches may be listed in a format as follows, where physical ports on the switch and their corresponding logical software interfaces are identified using the format: member/slot/port. For example, a single/standalone network switch device will be member 1. If there are no slots on the switch, the slot number is always 1. If a switch is a modular switch, a slot may specify the location of a module on a switch chassis (e.g., management modules may be specified as slots 1 and 2 on the front of the switch, and line modules may be specified starting at slot 3 on the front of the switch). Ports include a physical number of a port on a switch, and may be numbered starting at 1, 2, etc., up to a number of ports as per the switch capacity. In some examples, a switch capacity could include anywhere from 28-52 ports for some switch models. In these examples, if a stacked network switch has connected 10 members, it may have 10*(28–52) ports, e.g., 1/x/x, 2/x/x/ . . . 10/x/x. In this example, port-related UI screens may show the stack ports, e.g., based on number of members attached to the stacked switch.

A third component is the configuration push component 250, which in some examples, functions to operate the active connection to push the configurations to the device (or current conductor in the case of a stacked switch device). The configuration push component 250 may push the configuration via a device agent 230 which may manage one or more devices associated with a user.

When failover happens at the site/customer device location, the monitoring component 240 detects the failover and shows the current conductor accordingly. Similarly, the configuration push component 250 sees the connection failure with the old conductor and starts detecting a new connection with the standby switch which will then become the conductor of the network switch stack. The configuration push component 250 then uses the new current conductor connection to push the configuration, even if it has lost the connection to previous current conductor during configuration push. During this failover, the examples herein ensure that if a user tries to do any configuration change(s), the changes shall be implemented in a manner which is to be seamless from the user's perspective. The changes shall be applied using the correct/current conductor device using the connection to push the configuration changes to the correct/current conductor device.

To provide a seamless user experience during these failover scenarios, a mechanism according to examples herein is implemented in console 200, such that the UI-Backend component 220 allows configuring using the current conductor, as it receives the same information about the current conductor from what monitoring component 240 sees. In this manner, the user does not need to worry about which switch is the actual designated conductor switch of the network switch stack and does not need to have access to or go check at the physical site/location of the network switch stack. In this manner, user at UI 210 can see the same conductor as monitoring component 240.

The configuration push component 250 uses the current active conductor connection to push the configuration, even if it has lost the connection to the current conductor during configuration push due to failover. In some examples, the UI-Backend component 220 buffers all the configuration changes done by the user at the UI 210, stores the changes in cache memory 228 and makes sure they are pushed to the appropriate stacked switch (and appropriate conductor).

In this manner, the UI-Backend component 220 keeps and updates a simple map of stack ID to the current conductor (device serial-number/name) in cache memory 228. For example, in cache memory 228, Stack ID A has an entry 222 for a conductor switch device and entry 223 for a standby switch device, and Stack ID B has an entry 224 for a conductor and an entry 225 for a standby. In some examples, the stack ID of each stacked network switch does not change for the lifetime of the stack and during failover, but the conductor does change due to failover or user intervention.

UI-Backend component 220 will store any updated device configuration changes for, e.g., the stacked network switch corresponding to Stack ID A that it receives from UI 210, and will store it in the appropriate location in cache memory 228 corresponding to the current conductor known for stack ID A from the user's perspective, so that it can interact with right device configuration entry in cache memory 228 to show the stack configurations to the user.

The configuration push component 250, based on an active connection as received from device agent 230, will determine which switch (conductor or standby) it should push the configurations to, based on the active connection to the current conductor, even though the UI from the user's perspective may see the previous conductor during the failover process. The configuration push component 250 will return the running/active configurations from the stack switch with serial-number of the conductor that UI 210 has used to push the configurations. That way, the user can still view/edit the full stack configurations seamlessly even though the previous conductor might have failed over at the site/location.

The UI-Backend component 220 also has to update the correct entry in the cache memory for the current stack conductor on getting device configuration updates from configuration push component 250 and monitoring component 240. If the UI-Backend component 220 receives the information about the new conductor, the UI-Backend component 220 copies the inflight user configurations from the old conductor cache memory entry to the cache memory entry for the new conductor, so that any user configs during this failover are not lost. The configuration push component 250 then pushes the configuration changes to the correct conductor based on the updates from the monitoring component 240.

The configuration push component 250, based on an active connection as received from device agent 230, will figure out to which switch (conductor or standby) it should push the configs, even if the UI may be seeing the old conductor during the failover process. And the configuration push component 250 will return the running/active configurations from the stack switch with serial-number of the conductor that the UI has used to push the configurations. That way, the user can still view and/or edit the full stack configurations seamlessly even though the conductor might have failed over at the site/location.

Figure 3:
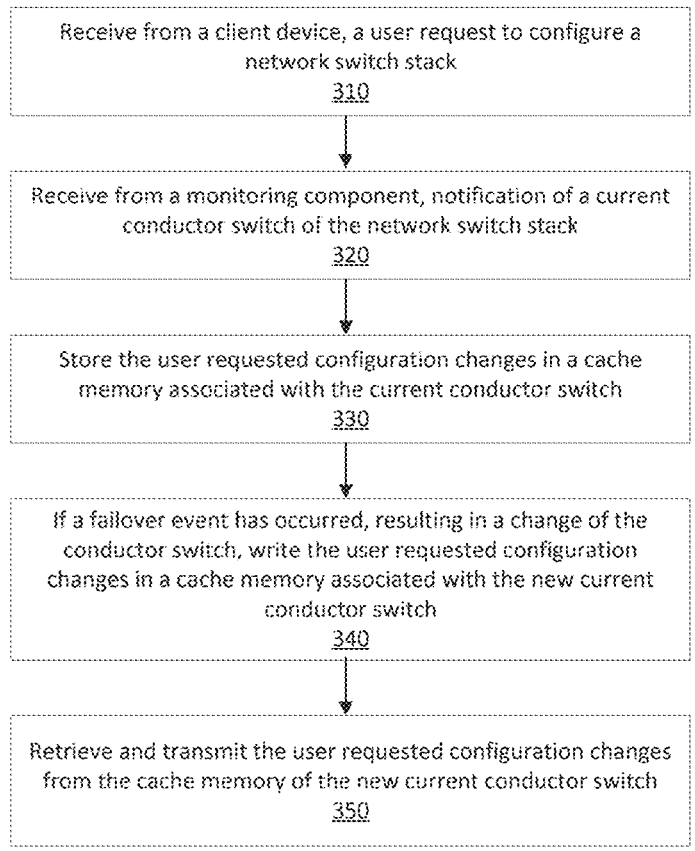
FIG. 3 illustrates a flow chart of steps performed by a user interface backend component of a network infrastructure management console in accordance with an example.

FIG. 3 illustrates a flow chart 300 of steps performed by a user interface backend component of a network infrastructure management console in accordance with an example. In step 310, a user request to configure a network switch stack is received from a client device. The user configuration request may identify the current conductor as seen from the UI's perspective. For example, a user using the UI can add/delete members to a selected network stack from a stack management user interface page. A user can also configure/manage links of stack members, etc. from the stack management UI page.

At step 320, the UI-Backend component may receive notification of a current conductor switch from the monitoring component. Where there has not been a failover event on the stacked switch the user is configuring, the current conductor switch identified by the monitoring component may be the same as the conductor identified by the user's configuration request. If a failover event at a conductor has occurred while the user is configuring the stacked switch where that conductor is located, the current conductor switch identified by the monitoring component may be the standby switch from the stack, even though the user's requested configuration changes identify the conductor that is now down or offline due to the failover event.

At step 330, as discussed above, the user requested configuration changes are stored in a cache memory associated with the current conductor switch of the stack as seen from the user's perspective. At step 340, if a failover event has occurred, resulting in a change of the conductor switch, the UI-Backend component writes the user-requested configuration changes in a cache memory segment associated with the new current conductor switch for the stack. At step 350, the user requested configuration changes are retrieved from the cache memory of the new (or current) conductor switch corresponding to the stack ID.

Figure 4:
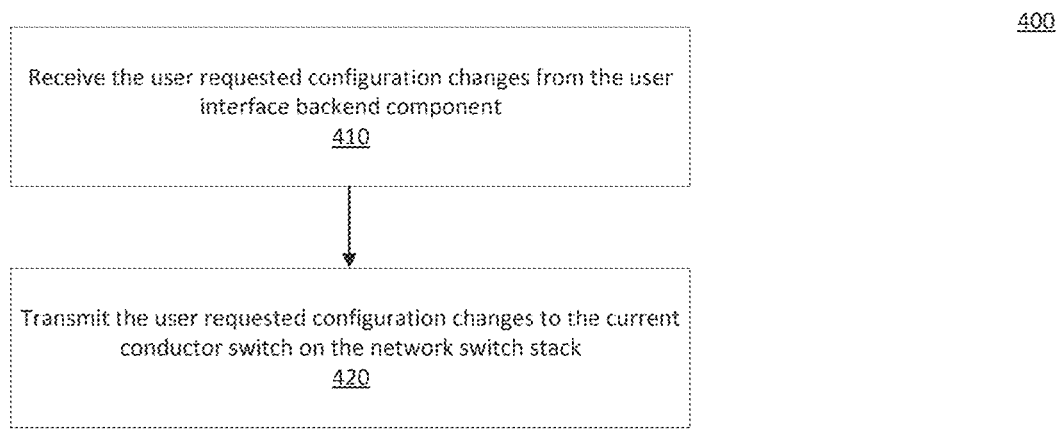
FIG. 4 illustrates a flow chart of steps performed by a configuration push component of a network infrastructure management console in accordance with an example.

FIG. 4 illustrates a flow chart 400 of steps performed by a configuration push component of a network infrastructure management console in accordance with an example.

In step 410, the configuration push component receives the user requested configuration changes from the UI-Backend component. The user requested configuration changes are identified as being made to the current conductor switch. If there has been no failover event, the current conductor switch will be the same conductor that was identified by the user's request. If there has been a failover event, the current conductor switch will now be the standby switch as mentioned above.

In step 420, the configuration push component transmits the user requested configuration changes through the device agent to the current conductor switch on the network switch stack. The configuration push component therefore will have the updated information about the current conductor from the UI-Backend component so the updated configuration will be transmitted to the conductor of the switch being configured and will not be affected by any intervening failover events.

Figure 5:
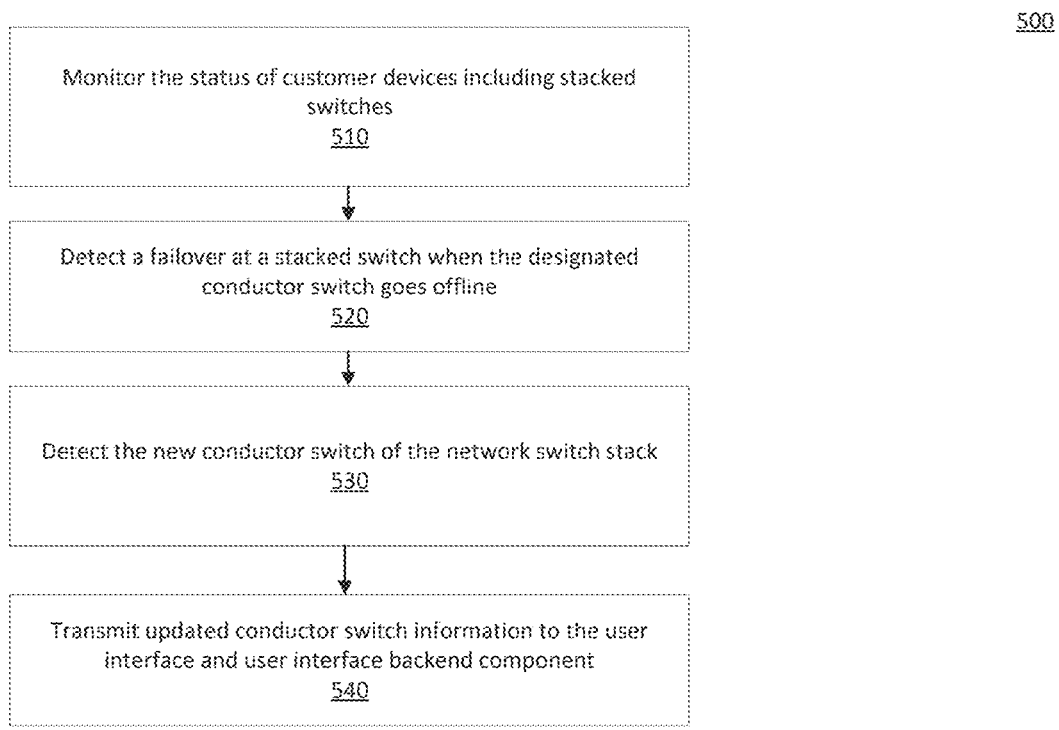
FIG. 5 illustrates a flow chart of steps performed by a monitoring component of a network infrastructure management console in accordance with an example.

FIG. 5 illustrates a flow chart 500 of steps performed by a monitoring component of a network infrastructure management console in accordance with an example.

In step 510, the monitoring component monitors the status of the network devices including standalone switches and stacked switches. Various network and device health metrics may be monitored on an ongoing basis for each switch and stacked switch.

In step 520, a failover is detected at a stacked switch when the designated conductor switch goes offline. The monitoring component will identify any failover event that occurs at a stacked switch, such as the conductor switch going down due to device failure or error, or user intervention as discussed herein.

In step 530, the monitoring component detects that the standby switch has been designated as the new conductor switch. Once the conductor at a stacked switch goes offline for any reason, the standby switch will then be designated as the conductor switch and will initiate operations as the conductor of the stack.

In step 540, the failover event and the new conductor switch information is transmitted to the user interface backend component and is displayed at the user interface. This is because the monitoring component will have identified that the failover event has occurred at the switch stack and that the standby switch has come online as the conductor. The current notifications of the conductor will be transmitted from the monitoring component to the UI-Backend component and the device agent.

Figure 6:
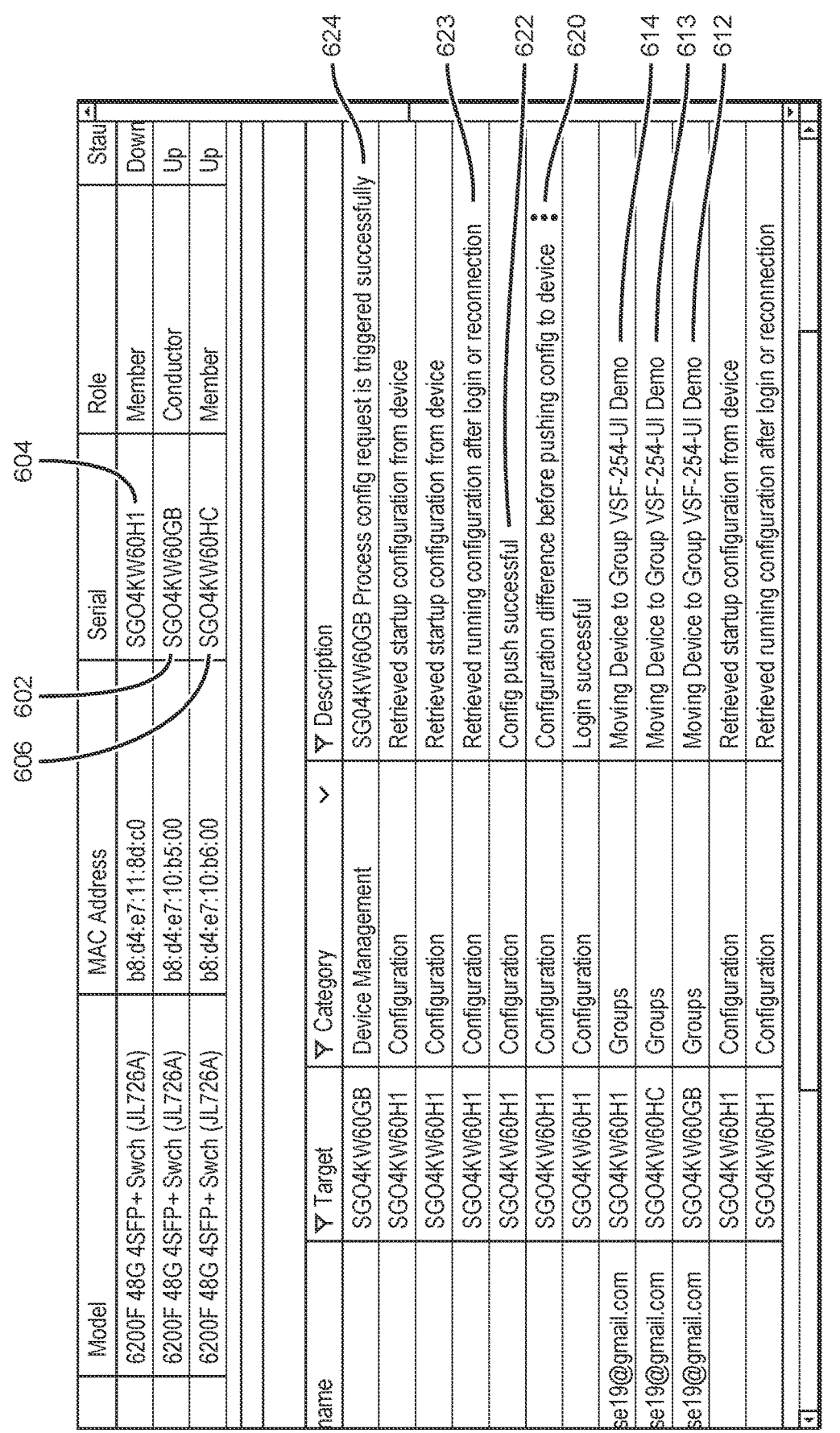
FIG. 6 illustrates a portion of a screen shot of an audit user interface in accordance with an example.

FIG. 6 illustrates a portion 600 of a screen shot of an audit user interface in accordance with an example. The top portion of the screen shows the current status of the conductor 602 and two members 604 and 606 of a stacked switch, where the conductor 602 has an "Up" status, and one member 604, a switch that is a member switch also serving as the designated standby switch, has a "Down" status.

The bottom portion of the screen shows a table of audit trail entries arranged in chronological order, with the most current audit trail entries near the top of the table. At audit trail entries 612, 613 and 614, the three devices are moved to a single group to work together as a stacked switch, with the switch labeled "SG04KW60H1" designated initially as the conductor switch.

At audit trail entry 620, a user has made a configuration change to the stacked switch which targets the conductor switch which is "SG04KW60H1," and the configuration change is pushed to the conductor switch, at least from the user's perspective, as shown at 622. Once the UI-Backend component and Monitoring component gets the notification of change of conductor, in one example, the UI/Monitoring page will reflect the earlier standby as the current conductor. And the Audit Trail page below will show the failover event happened at the site as a reconnection event 623, with the serial number of the new conductor showing as the target of the process configuration request at entry 624.

When failover happens at a stacked switch at a site/physical location, the monitoring component is getting updates from the device agent, so it refreshes the UI to show the current conductor as per the notification. Similarly, the configuration push component is also getting a notification from the device agent, and will use that conductor connection as the current conductor to push configurations. Since all these are different services/process and on a cloud platform (and can be distributed across multiple locations, servers, and/or networks) there can be a time gap when each of them gets the notification of the current conductor. The UI page may still see the old conductor (let's call it conductor A) for some time period, since it has not got the notification and didn't update the user's UI screen. During this time, a user may try to do some configuration selecting whatever conductor the Monitoring UI page is showing.

However, if the configuration push component is already updated with the current conductor (let's call it conductor B), then it will error out/fail this user config request because for the configuration push component, A is not the conductor. Similarly, if the monitoring component gets the notification first, then user will try configuring using Conductor B, and if the configuration push component didn't get notification yet, it will fail the user configuration as it still thinks A is conductor and B is standby.

Examples disclosed herein address these issues, and therefore remove the errors and/or ambiguity a user may see during the failover, particularly in scenarios where the user is managing the stack from web/cloud from some location, and the site/physical location of the stack can be in a different location, or even a different city/state. Thus, in various examples disclosed herein, the UI-Backend component takes notification of the current conductor from the Monitoring component, so that the Monitoring component and UI-Backend component are always seeing the same Conductor to accept user configurations.

In addition, the configuration push component takes the UI request with whatever Conductor the UI-Backend component sends, but will push to the Conductor that it was notified about and has connection with. When failover is detected by UI-Backend component, it will copy the in-flight user configurations and the whole stack configuration cache to new Conductor cache. With that (1) no user configs are lost or have to be redone, (2) the user doesn't see any error while doing configuration during and after the failover and (3) the user can always see the full configuration of the stack from the current conductor cache in the UI.

Figure 7:
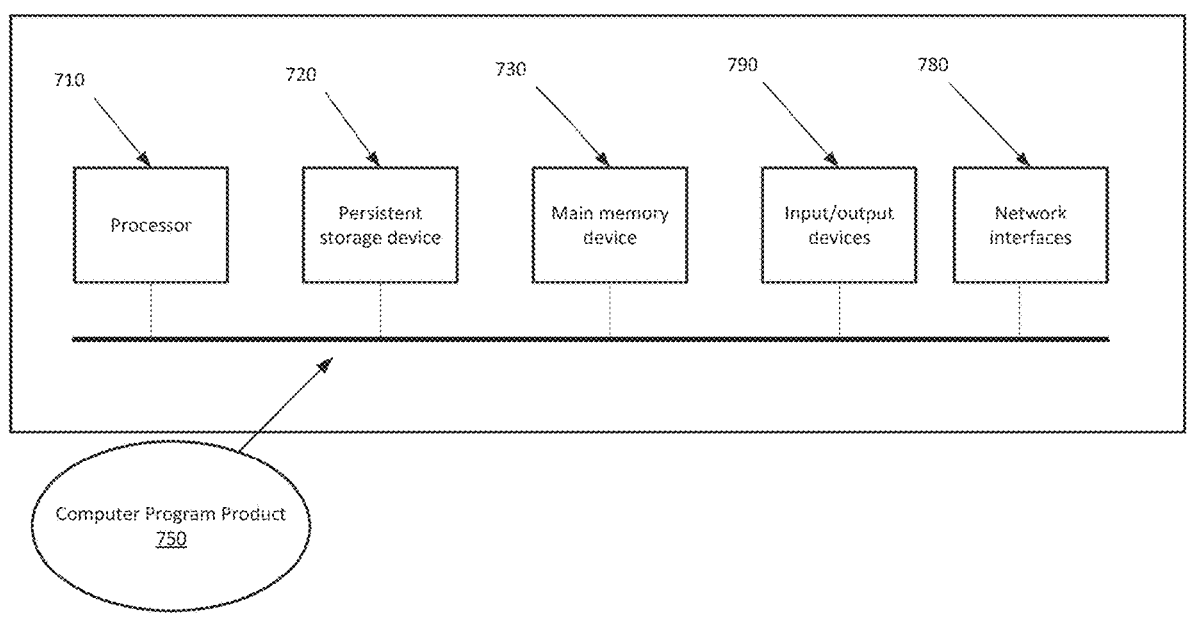
FIG. 7 illustrates a block diagram of a distributed computer system that can be used for implementing one or more aspects of the various examples.

A high-level block diagram of an apparatus that may be used to implement systems, apparatus and methods described herein is illustrated in FIG. 7. Apparatus 700, which may include one or more server computers or portions thereof as discussed, comprises a processor 710 operatively coupled to a persistent storage device 720 and a main memory device 730. In examples, processor 710 is located on one or a plurality of virtual or physical processors. Processor 710 controls the overall operation of apparatus 700 by executing computer program instructions that define such operations. The computer program instructions may be stored in persistent storage device 720, or other computer-readable medium, and loaded into main memory device 730 when execution of the computer program instructions is desired. Thus, the method steps of FIGS. 3, 4 and 5 can be defined by the computer program instructions stored in main memory device 730 and/or persistent storage device 720 and controlled by processor 710 executing the computer program instructions. For example, the computer program instructions can be implemented as computer executable code programmed by one skilled in the art to perform one or more algorithm defined by the method steps of FIGS. 3, 4 and 5. Accordingly, by executing the computer program instructions, the processor 710 executes an algorithm defined by the method steps of FIGS. 3, 4 and 5. Additionally, or alternatively, instructions for implementing the method steps of FIGS. 3, 4 and 5 in accordance with disclosed examples may reside in computer program product 750. When processor 710 is executing the instructions of computer program product 750, the instructions, or a portion thereof, are typically loaded into main memory device 730 from which the instructions are readily accessed by processor 710.

Apparatus 700 or devices coupled thereto may also include one or more network interfaces 780 for communicating with other devices via a network, whether a wired or wireless network. Apparatus 700 may also include one or more input/output devices 790 that enable user interaction with apparatus 700 (e.g., a display, a keyboard, a mouse, speakers, buttons, etc.).

Processor 710 may include both general and special purpose microprocessors and may be the sole processor or one of multiple processors of apparatus 700. Processor 710 may comprise one or more central processing units (CPUs), and one or more graphics processing units (GPUs), which, for example, may work separately from and/or multi-task with one or more CPUs to accelerate processing, e.g., for various image processing applications described herein. Processor 710, persistent storage device 720, and/or main memory device 730 may include, be supplemented by, or incorporated in, one or more application-specific integrated circuits (ASICs) and/or one or more field programmable gate arrays (FPGAs).

Persistent storage device 720 and main memory device 730 each comprise a tangible non-transitory computer readable storage medium. Persistent storage device 720, and main memory device 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 790 may include peripherals, such as a printer, scanner, display screen, etc. that are coupled to the apparatus. For example, input/output devices 790 may include a display device such as a cathode ray tube (CRT), plasma or liquid crystal display (LCD) monitor for displaying information (e.g., a monitoring, configuration, or audit user interface (UI) screens) to a user, a keyboard, and a pointing device such as a mouse or a trackball by which the user can provide input to apparatus 700.

Any or all of the systems and apparatuses discussed herein may be performed by, and/or incorporated in, an apparatus such as apparatus 700.

One skilled in the art will recognize that an implementation of an actual computer or computer system may have other structures and may contain other components as well (e.g., batteries, fans, motherboards, power supplies, etc.), and that FIG. 7 is a high-level representation of some of the components of such a computer for illustrative purposes.

One should appreciate that the disclosed techniques provide many advantageous technical effects including improving failover handling by allowing a user to, either remotely or on site, view and edit the full network switch stack configuration seamlessly even when the conductor switch of the network switch stack has failed over to a standby switch which is acting as conductor. It should also be appreciated that the following specification is not intended as an extensive overview, and as such, concepts may be simplified in the interests of clarity and brevity.

The elements illustrated in FIGS. 1 and 2, and the various functions attributed to each of the elements, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to a programming environment of a compute instance, a client device, a cloud native management console or other network infrastructure management system, at least one processor, a non-transitory (or persistent) storage device, or a main memory device should be read to include any suitable combination of computing devices, including servers, interfaces, systems, databases, agents, peers, controllers, or other types of computing devices operating individually or collectively to perform the functions ascribed to the various elements. Further, one skilled in the art will appreciate that one or more of the functions of the system of FIG. 1 described herein may be performed within the context of a client-server relationship, such as by one or more servers, one or more client devices (e.g., one or more user devices) and/or by a combination of one or more servers and client devices.

Systems, apparatus, and methods described herein may be implemented using a computer program product 750 tangibly realized in an information carrier, e.g., in a non-transitory machine-readable storage device, for execution by a programmable processor; and the method steps described herein, including one or more of the steps of FIGS. 4, 5, and 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

The various examples have been described with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The following specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described below, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the discussion, references to servers, services, interfaces, clients, peers, portals, platforms, or other systems formed from computing devices. is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer or compute instance should be read to include any suitable computing device or combination of computing devices, including, for example, one or more servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

What is claimed is:

1. A network infrastructure management system, comprising:
    at least one memory having computer-readable instructions stored thereon which, when executed by at least one processor coupled to the at least one memory, cause the at least one processor to:
    receive, at a user interface backend component and from a user interface, a request comprising a configuration change and an identification of a current conductor switch of a network switch stack;
    store, by the user interface backend component, the configuration change in a first cache memory associated with the current conductor switch of the network switch stack;

determine, after the request is received and before the configuration change is transmitted to a configuration push component, that a failover event has caused a change from the current conductor switch to a new current conductor switch for the network switch stack;

store, based on the determination, the configuration change in a second cache memory associated with the new current conductor switch;

retrieve the configuration change from the second cache memory;

transmit the configuration change to the configuration push component; and transmit the configuration change from the configuration push component to the network switch stack.

2. The network infrastructure management system of claim 1, wherein execution of the instructions by the at least one processor further cause the at least one processor to:

detect, by the user interface backend component and before the configuration change is stored in the second cache memory, the new current conductor switch of the network switch stack.

3. The network infrastructure management system of claim 1, wherein the user interface backend component comprises a Stack ID map comprising a plurality of stack identifiers, wherein each stack identifier is associated with a respective network switch stack and a respective current conductor switch identifier.

4. The network infrastructure management system of claim 3, wherein, when the failover event occurs, an entry in the Stack ID map associated with the network switch stack is updated to include a new current conductor switch identifier associated with the new current conductor switch.

5. The network infrastructure management system of claim 3, wherein a stack identifier of the plurality of stack identifiers remains the same for as long as the respective network switch stack associated with the stack identifier is in service.

6. The network infrastructure management system of claim 1, wherein execution of the instructions by the at least one processor further cause the at least one processor to:

configure the user interface for display at a client device configured to access the network switch stack.

7. The network infrastructure management system of claim 6, wherein the failover event occurs after the user interface configured for display at the client device and before the request is received.

8. A computer-implemented method, comprising:

receiving, at a user interface backend component and from a user interface, a request comprising a configuration change and an identification of a current conductor switch of a network switch stack;

storing, by the user interface backend component, the configuration change in a first cache memory associated with the current conductor switch;

determining, after the request is received and before the configuration change is transmitted to a configuration push component, that a failover event has caused a change from the current conductor switch to a new current conductor switch for the network switch stack;

storing, based on the determination, the configuration change in a second cache memory associated with the new current conductor switch; and transmitting the configuration change to the configuration push component.

9. The computer-implemented method of claim 8, further comprising:

detecting, by the user interface backend component and before the configuration change is stored in the second cache memory, the new current conductor switch of the network switch stack.

10. The computer-implemented method of claim 8, wherein the user interface backend component comprises a Stack ID map comprising a plurality of stack identifiers, wherein each stack identifier is associated with a respective network switch stack and a respective current conductor switch identifier.

11. The computer-implemented method of claim 10, wherein, when the failover event occurs, an entry in the Stack ID map associated with the network switch stack is updated to include a new current conductor switch identifier associated with the new current conductor switch.

12. The computer-implemented method of claim 10, wherein a stack identifier of the plurality of stack identifiers remains the same for as long as the respective network switch stack associated with the stack identifier is in service.

13. The computer-implemented method of claim 8, further comprising:

configuring the user interface for display at a client device configured to access the network switch stack.

14. The computer-implemented method of claim 13, wherein the failover event occurs after the user interface configured for display at the client device and before the request is received.

15. A non-transitory computer-readable medium storing programming for execution by one or more processors, the programming comprising instructions to:

receive, at a user interface backend component and from a user interface, a request comprising a configuration change and an identification of a current conductor switch of a network switch stack;

store, by the user interface backend component, the configuration change in a first cache memory associated with the current conductor switch of the network switch stack;

determine, after the request is received and before the configuration change is transmitted to a configuration push component, that a failover event has caused a change from the current conductor switch to a new current conductor switch for the network switch stack;

store, based on the determination, the configuration change in a second cache memory associated with the new current conductor switch;

retrieve the configuration change from the second cache memory;

transmit the configuration change to the configuration push component; and transmit the configuration change from the configuration push component to the network switch stack.

16. The non-transitory computer-readable medium of claim 15, wherein the programming comprises further instructions to:

detect, by the user interface backend component and before the configuration change is stored in the second cache memory, the new current conductor switch of the network switch stack.

17. The non-transitory computer-readable medium of claim 15, wherein the user interface backend component comprises a Stack ID map comprising a plurality of stack identifiers, wherein each stack identifier is associated with a respective network switch stack and a respective current conductor switch identifier.

18. The non-transitory computer-readable medium of claim 17, wherein, when the failover event occurs, an entry in the Stack ID map associated with the network switch stack is updated to include a new current conductor switch identifier associated with the new current conductor switch.

19. The non-transitory computer-readable medium of claim 15, wherein the programming comprises further instructions to:
 configure the user interface for display at a client device configured to access the network switch stack.

20. The non-transitory computer-readable medium of claim 19, wherein the failover event occurs after the user interface configured for display at the client device and before the request is received.

* * * * *